United States Patent
Dotan et al.

(10) Patent No.: US 9,177,127 B1
(45) Date of Patent: Nov. 3, 2015

(54) CONFOUNDER GENERATION IN KNOWLEDGE-BASED AUTHENTICATION FOR AN ENTERPRISE

(71) Applicant: EMC Corporation, Hopkinton, MA (US)

(72) Inventors: Yedidya Dotan, Newton, MA (US); Shai Gabai, Kfar Saba (IL)

(73) Assignee: EMC Corporation, Hopkinton, MA (US)

( * ) Notice: Subject to any disclaimer, the term of this patent is extended or adjusted under 35 U.S.C. 154(b) by 279 days.

(21) Appl. No.: 13/731,367

(22) Filed: Dec. 31, 2012

(51) Int. Cl.
*G06F 21/31* (2013.01)
*G06N 99/00* (2010.01)

(52) U.S. Cl.
CPC ............... *G06F 21/31* (2013.01); *G06N 99/00* (2013.01)

(58) Field of Classification Search
CPC .............................. G06F 21/30; G06N 99/00
USPC .......................................................... 706/62
See application file for complete search history.

(56) References Cited

U.S. PATENT DOCUMENTS

| 8,412,938 | B2 | 4/2013 | Farrugia et al. | |
|---|---|---|---|---|
| 8,850,537 | B1 | 9/2014 | Dotan et al. | |
| 2003/0154406 | A1* | 8/2003 | Honarvar et al. | 713/201 |

OTHER PUBLICATIONS

A. Nosseir and S. Terzis, "Towards Authentication via Selected Extraction from Electronic Personal History", Int'l Conf. on Enterprise Info. Sys. 2010, pp. 571-586.*
M. Nishigaki and M. Koike, "A User Authentication Based on Personal History—A User Authentication System Using E-mail History", Systemics, Cybernetics, and Informatics, vol. 5, No. 2, 2007, pp. 18-23.*
A. Nosseir et al., "Internet Authentication Based on Personal History—A Feasibility Test", Proc. Customer Focused Mobile Services Workshop at WWW2005, ACM, 6 pages.*

* cited by examiner

*Primary Examiner* — Kakali Chaki
*Assistant Examiner* — Vincent Gonzales
(74) *Attorney, Agent, or Firm* — BainwoodHuang

(57) ABSTRACT

An improved technique generates confounders for KBA questions from personal information management (PIM) data created from within an organization. An enterprise KBA (eKBA) server collects PIM data such as email data for a particular member of the organization. For email data, the eKBA server extracts facts from the headers of emails and generates queries having a corresponding correct answer from a first subset of the facts. Moreover, the eKBA server extracts a set of confounders from a second subset of the facts. The eKBA server then forms a multiple-choice KBA question from the query, the corresponding correct answer, and selected confounders.

15 Claims, 6 Drawing Sheets

```
Return-Path: <EmployeeB@example.com>
Received: from [156.158.39.119] (HELO example.com)          82
    by fe3.example.com (Internal SMTP xx.xx) for
EmployeeA@mail.example.com; Mon, November 5 2012
11:40:10 -0400                                                          80
...
Date: Mon, Nov 5 2012 11:40:36 -0400
From: Employee B <EmployeeB@example.com>
...
To: Employee A <EmployeeA@mail.example.com>
Cc: Employee C <EmployeeC@mail.example.com>
Subject: Weekly Meeting Today
```

84

```
Return-Path: <EmployeeD@example.com>
Received: from [243.147.9.134] (HELO example.com)           88
    by fe3.example.com (Internal SMTP xx.xx) for
EmployeeA@mail.example.com; Thurs, November 1 2012
10:42:51 -0400
...
Date: Thurs, Nov 1 2012 10:43:12 -0400
From: Employee D <EmployeeD@example.com>                                86
...
To: Employee A <EmployeeA@mail.example.com>
Cc: Employee E <EmployeeE@mail.example.com>
Subject: Lunch
```

| | User Identifier | Context | Confounders |
|---|---|---|---|
| 100 | Member A | Weekly Meeting Nov 5 | Member D |
| | | | Member E |
| | | | Member F |
| | | | Member G |
| | | | |
| 102 | Member A | Lunch | Member B |
| | | | Member C |
| | | | Member F |
| | | | Member G |

Figure 4

CONFOUNDER GENERATION IN KNOWLEDGE-BASED AUTHENTICATION FOR AN ENTERPRISE

BACKGROUND

Conventional knowledge-based authentication (KBA) involves deriving questions regarding a particular user from facts in a publicly available database, and asking that user one or more of the derived questions to verify the authenticity of the user. For example, conventional KBA accesses facts such as addresses, mortgage payments, and driving records from a LexisNexis® server, a credit bureau or a motor vehicle registry.

Suppose that a user wishes to make a purchase at a store using a store account. In conventional KBA, the store may ask the user a set of questions derived from a set of facts concerning the user in order to complete the purchase. Such questions may include "where did you live in September, 1998?", "what is your current mortgage payment to within 20 dollars?", and "what make and model car did you drive in February, 2001?". If the user answers the questions correctly, the store completes the purchase. On the other hand, if the user answers questions incorrectly, the store may take remedial steps to verify the authenticity of the user. For example, the store may ask for further proof of identity such as a driver's license.

In many scenarios, the questions used in conventional KBA take the form of multiple-choice questions. Such multiple-choice questions include a correct choice and a set of wrong choices. In conventional KBA, software packages such as IBM Smart Analytics System provides the set of wrong choices for a KBA question from data in the publicly available database.

SUMMARY

Unfortunately, there are deficiencies with the above-described conventional KBA approach. For example, the nature of the confounders drawn from publicly available databases by the above-mentioned third-party software may not be appropriate for authenticating members of an organization having limited numbers. For example, for questions about the names of people having some relation to a user in question, such third-party software is typically trained to generate incorrect answers based on ethnicity. Along these lines, consider a user in Israel being asked about a roommate's name. The third-party software would likely present Israeli names as non-trivial incorrect answers. Nevertheless, within an organization that is a multinational corporation where users of all ethnicities interact on a regular basis, such incorrect answers may not provide the most effective authentication results.

Furthermore, the cost of third-party software packages that generate incorrect answers to KBA questions is typically very high. Further, the publicly available databases are very large and require vast resources to manage. For example, consider a medium-size organization of about 2000 people that wishes to authenticate a person claiming to be a member of that organization. While the publicly available databases store data for potentially millions of people, data for incorrect answers to KBA questions need only be drawn from that pool of 2000 people in order to provide effective authentication for those 2000 people. Software having such limited scope would necessarily be able to generate better incorrect answers for someone wishing to authenticate as one of those 2000 people, at a lower cost and complexity.

Moreover, facts obtained from a publicly available database may be known by members of the public. Consequently, incorrect answers to KBA questions derived from such facts may be insecure because an imposter may have examined facts relevant to a particular legitimate user.

In contrast to conventional KBA which uses expensive third-party software to derive potentially ineffectual incorrect answers to KBA questions from insecure, publicly available databases, an improved technique generates confounders for KBA questions from personal information management (PIM) data created from within an organization. An enterprise KBA (eKBA) server collects PIM data such as email data for a particular member of the organization. For email data, the eKBA server extracts facts from the headers of emails and generates queries having a corresponding correct answer from a first subset of the facts. Moreover, the eKBA server extracts a set of confounders from a second subset of the facts. The eKBA server then forms a multiple-choice KBA question from the query, the corresponding correct answer, and selected confounders.

Advantageously, the improved technique provides an inexpensive, yet secure, eKBA system for generating confounders for multiple-choice KBA questions for use inside of an organization. The eKBA system is inexpensive because it is designed to work with a limited data set: that pertaining to email data inside of an organization. The eKBA system is secure for the same reason. Further, the system generates confounders based on peer circles deduced by the eKBA system from email headers, rather than ethnicity which can lead to ineffective confounders.

One embodiment of the improved technique is directed to a method of generating a knowledge-based authentication (KBA) question configured to be provided to a person requesting authentication as a user that is a member of an organization, the KBA question including a query, a correct answer corresponding to the query, and a set of incorrect answers corresponding to the query. The method includes producing personal information management (PIM) data from communications involving members of the organization, PIM data from communications involving a particular member of the organization including a reference to the particular member. The method also includes obtaining a set of user facts from the PIM data that includes a reference to the user. The method further includes generating a set of confounders from user facts of the set of user facts. The method further includes selecting incorrect answers from the set of confounders to form the set of incorrect answers corresponding to the query of the KBA question.

Additionally, some embodiments of the improved technique are directed to a system constructed and arranged to. The system includes a network interface, memory, and a controller including controlling circuitry constructed and arranged to carry out the method of generating a knowledge-based authentication (KBA) question configured to be provided to a person requesting authentication as a user that is a member of an organization.

Furthermore, some embodiments of the improved technique are directed to a computer program product having a non-transitory computer readable storage medium which stores code including a set of instructions to carry the method of generating a knowledge-based authentication (KBA) question configured to be provided to a person requesting authentication as a user that is a member of an organization.

BRIEF DESCRIPTION OF THE DRAWING

The foregoing and other objects, features and advantages will be apparent from the following description of particular embodiments of the invention, as illustrated in the accompa

FIG. 3 is a block diagram illustrating an example email headers stored within a PIM server shown in FIG. 1.

FIG. 4 is a block diagram illustrating an example confounder database shown within the enterprise KBA system shown in FIG. 2.

DETAILED DESCRIPTION

An improved technique generates confounders for KBA questions from personal information management (PIM) data created from within an organization. An enterprise KBA (eKBA) server collects PIM data such as email data for a particular member of the organization. For email data, the eKBA server extracts facts from the headers of emails and generates queries having a corresponding correct answer from a first subset of the facts. Moreover, the eKBA server extracts a set of confounders from a second subset of the facts. The eKBA server then forms a multiple-choice KBA question from the query, the corresponding correct answer, and selected confounders.

Advantageously, the improved technique provides an inexpensive, yet secure, eKBA system for generating confounders for multiple-choice KBA questions for use inside of an organization. The eKBA system is inexpensive because it is designed to work with a limited data set: that pertaining to email data inside of an organization. The eKBA system is secure for the same reason. Further, the system generates confounders based on peer circles deduced by the eKBA system from email headers, rather than ethnicity which can lead to ineffective confounders.

Figure 1:
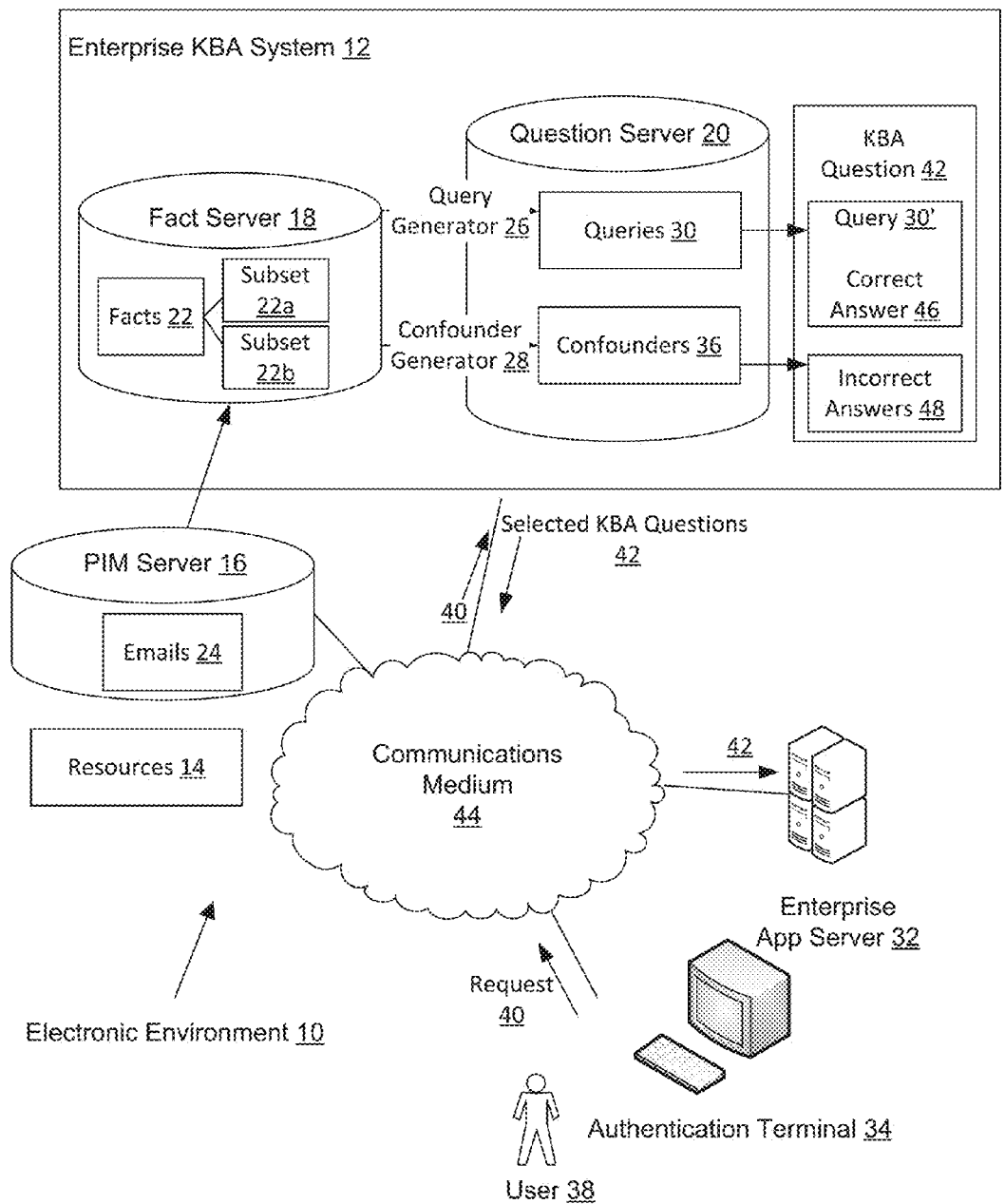
- FIG. 1 is a block diagram illustrating an example electronic environment for carrying out the improved technique.

FIG. 1 illustrates an example electronic environment 10 for carrying out the improved technique. Electronic environment 10 includes eKBA system 12, personal information management (PIM) server 16, enterprise app server 32, authentication terminal 34, and communications medium 44.

Communication medium 44 provides network connections between eKBA system 12, PIM server 16, enterprise app server 32, and authentication terminal 34. Communications medium 44 may implement a variety of protocols such as TCP/IP, UDP, ATM, Ethernet, Fibre Channel, combinations thereof, and the like. Furthermore, communications media 44 may include various components (e.g., cables, switches/routers, gateways/bridges, NAS/SAN appliances/nodes, interfaces, etc.). Moreover, the communications medium 44 are capable of having a variety of topologies (e.g., queue manager-and-spoke, ring, backbone, multi drop, point to-point, irregular, combinations thereof, and so on).

PIM server 16 stores applications and data concerning personal information including email for members of an enterprise. For example, the enterprise may be a corporation whose members are employees. Data stored in PIM server 16 takes the form of email messages 24 between members of the enterprise. In some arrangements, the email messages 24 may be exchanged between members of the enterprise and other people external to the enterprise.

eKBA system 12 obtains facts 22 from PIM server 16, stores facts 22 on fact server 18, generates KBA questions 30 from facts 22, and provides selected KBA questions 42 to authentication terminal 34 via enterprise app server 32. KBA system 12 includes a fact server 18, a question server 20, a query generator 26, and a confounder generator 28.

Fact server 18 is an electronic system in communication with question generator 26. Fact server 18 acquires facts 22 from PIM server 16 and stores facts 22 within a fact database 74 (see FIG. 2). In some arrangements, fact server 18 generates facts 22 from documents 24 stored on PIM server 16.

Question server 20 is an electronic system in communication with query generator 26, confounder generator 28, and communications medium 44. Question server 20 stores queries 30 generated by query generator 26, confounders 36 generated by confounder generator 28, and KBA question 42. Question server 20 also selects confounders 36 to be used as incorrect answers 48 for KBA question 42.

Query generator 26 is an electronic system in communication with fact server 18 and question server 20 that generates queries 30 from a subset 22a of facts 22. Query 30' of KBA question 42 is the question statement, as opposed to the multiple choices provided with the query as part of KBA question 42. Query generator 26 is also configured to produce the correct answer 46 to query 30' of KBA question 42.

Confounder generator 28 is an electronic system in communication with fact server 18 and question server 20 that generates confounders 36 from another subset 22b of facts 22. A confounder is a possible answer to query of KBA question 42 that is incorrect, but is configured to appear as a plausible answer to the query.

Enterprise app server 26 provides an application programming interface (API) for providing questions to user 38.

Authentication terminal 34 receives questions from enterprise app server 32 and presents them to user 38, in some cases through a service representative. In some arrangements, authentication terminal 32 is a Netview terminal.

During operation, eKBA system 12 extracts a set of facts 22 from emails 24 stored on PIM server 16. In some arrangements, eKBA system 12 performs the extraction on a periodic basis, e.g., a nightly run. In other arrangements, however, eKBA system performs the extraction in response to an event.

It should be understood that, as a consequence of facts 22 being derived from emails 24 stored on PIM server 16, each fact 22 includes a reference to at least one user identifier of a member of the organization that controls PIM server 16. In this way, facts 22 are, in many cases, expressions of a relationship between members of the organization, For example, one fact, derived from an email, states that "Member A sent Member B an email on Day C at Time D about Meeting M."

eKBA system 12 then generates queries 30 from subset 22a of facts 22 using query generator 26. In this way, for each member of the organization, eKBA system 12 stores a set of queries 30 on question server 20. Along these lines, eKBA server 12 may derive the query "Which Member sent Member A an email on Day C?" based on the fact "Member A sent Member B an email on Day C at Time D." Alternatively, eKBA server 12 may derive the query "About what meeting did Member A mention to Member B in the email sent on Day C?" based on the fact "Member A sent Member B an email on Day C about Meeting M."

It should be understood that query generator 26 produces a correct answer 46 along with query 30'. In the case of the former example above, correct answer 46 corresponding to query 30' takes the form "Member B." In the case of the latter example above, correct answer 46 corresponding to query 30' takes the form "Meeting M."

eKBA system 12 also generates confounders 36 from subset 22b of facts 22 using confounder generator 28. In some arrangements, subset 22b is distinct from subset 22a in that every element of subset 22b is not an element of subset 22a. In some further arrangements, subset 22a is derived from a first subset of emails 24, and subset 22b is derived from a second subset of emails 24.

Along these lines, suppose that the second subset of emails 24 includes emails between Member A and Member C, Member D, and Member E, concerning Meeting N, Meeting P, and Meeting Q, respectively. One set of confounders 36, corresponding to a user identifier context, takes the form of the set {"Member C", "Member D", "Member E"}. Another set of confounders 36, corresponding to a topical context, takes the form of the set {"Meeting N", "Meeting P", "Meeting Q"}.

In some arrangements, eKBA system 12 scans headers of emails 24 for information regarding other contexts that may not be explicitly stated in a subject line. For example, eKBA system 12 may extract geolocation information from headers of emails 24 for use in facts 22. Confounder generator 28 may use the geolocation information for additional confounders 36. Further details of extraction of data from email headers will be described below with respect to FIG. 3.

At some time after queries 30 and confounders 36 have been generated, user 38 sends, to eKBA system 12, a request 40 to access resources 14. Request 40 includes a user identifier associated with a member of the organization.

Upon receipt of request 40, eKBA system 12 provides user 38 with a selected KBA question 42 that includes a query 30', a correct answer 46 to query 30', and a set of incorrect answers 48 selected from confounders 36. In some arrangements, eKBA system 12 selects set of incorrect answers 48 at random from confounders 36. Further details concerning the selection of confounders 36 for set of incorrect answers 48 will be described below with respect to FIG. 4.

User 38 provides eKBA system 12 with an answer in the form of a selection of either the correct answer 46 or one of incorrect answers 48 to query 30', and based on the answer, eKBA system 12 authenticates user 38.

Further details concerning eKBA system 12 will be discussed below with respect to FIG. 2.

Figure 2:
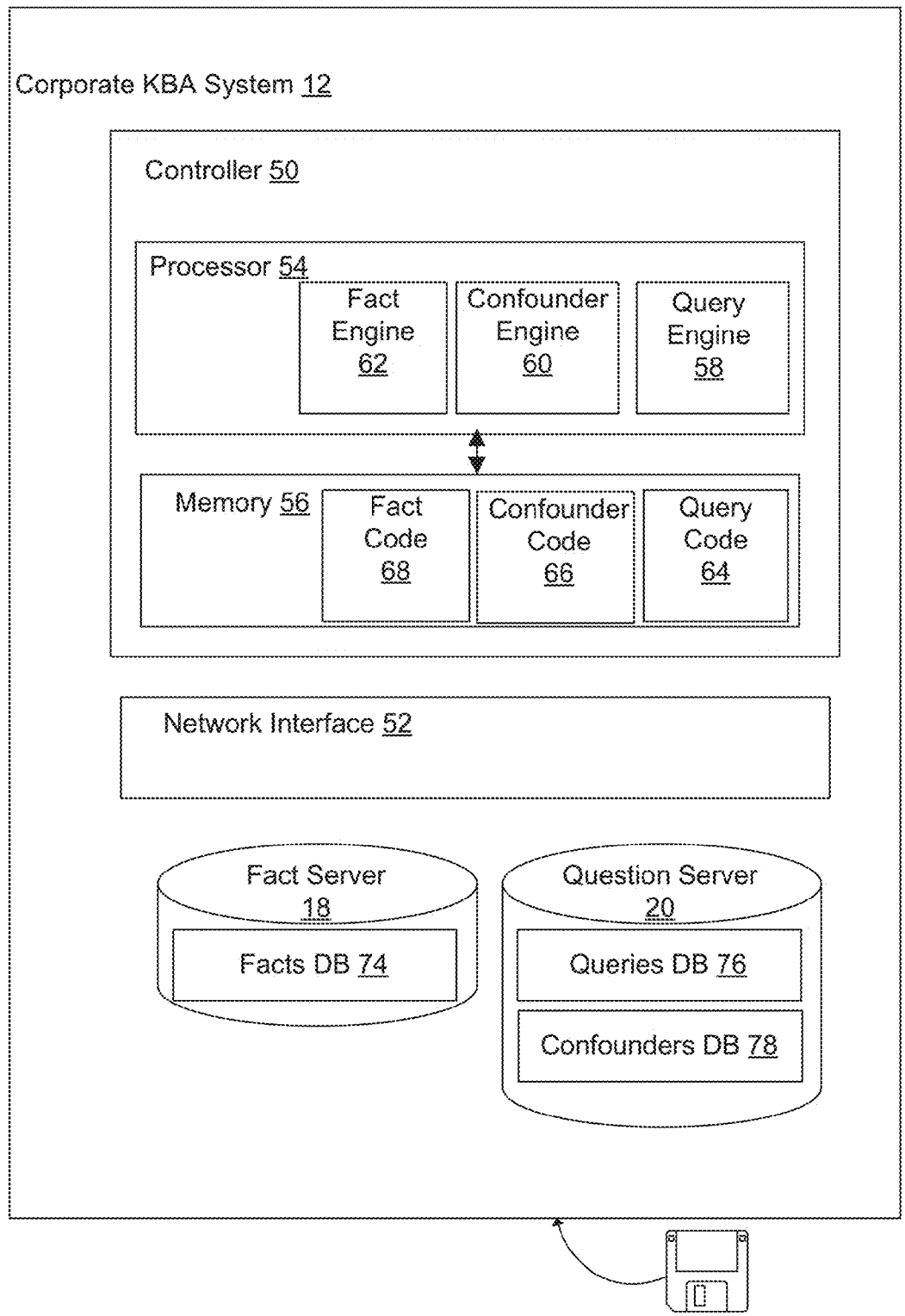
FIG. 2 is a block diagram illustrating an example enterprise KBA system within the electronic environment shown in FIG. 1.

FIG. 2 illustrates further details of eKBA system 12. eKBA system 12 includes controller 50 which in turn includes processor 54 and memory 56, network interface 52, fact server 18 on which facts database 74 is stored, and question server 20 on which queries database 76 and confounders database 78 are stored.

Network interface 52 takes the form of an Ethernet card; in some arrangements, network interface 52 takes other forms including a wireless receiver and a token ring card.

Memory 56 is configured to store code which includes query code 64 configured to generate a set of queries 30 from facts 22 (see FIG. 1) stored in facts database 74 on fact server 18. Queries 30, in turn, are stored in queries database 76 on question server 20. Memory 56 is also configured to store confounder code 66 configured to generate a set of confounders 36 from facts 22. Memory 56 is further configured to store fact code 68 configured to produce facts from emails 24 (see FIG. 1). Memory 50 generally takes the form of, e.g., random access memory, flash memory or a non-volatile memory.

In some arrangements, query code 64 is configured to extract a first subset 22a of facts 22 (see FIG. 1) with regard to a particular member of the organization. Confounder code 66, then, is configured to extract a second subset 22b of facts 22 that is distinct from subset 22a.

Processor 54 takes the form of, but is not limited to, Intel or AMD-based MPUs, and can include a single or multi-cores each running single or multiple threads. Processor 48 is coupled to memory 56 and is configured to execute instructions from query code 64, confounder code 66, and fact code 68. Processor 48 includes query engine 58, confounder engine 60, and fact engine 62.

During operation, processor 54 accesses emails 24 over network interface 52. For example, PIM server 16 may include a database (not pictured) on which emails 24 are stored. In some arrangements, PIM server 16 stored emails 24 in an Active Directory; details about such an arrangement will be discussed below with respect to FIG. 5.

Fact engine 62 forms facts 22 from emails 24 accessed on PIM server 16. In some arrangements, fact engine 62 parses headers of emails 24 for particular keywords, e.g., "meeting," "travel,", etc. Further details of fact engine parsing email headers will be discussed below with respect to FIG. 3.

FIG. 3 illustrates an example set of emails 22 including email 80 and email 86. Email 80 includes header 82 and payload 84, while email 86 includes header 88 and payload 90.

Suppose that eKBA server 12 derives facts regarding Member A of the organization from email 80 in order to derive queries 30. Fact engine 62 (see FIG. 2) scans header 82 for particular keywords, especially "To:", "From", "CC", "Subject", and "Date". With these particular keywords, fact engine 62 extracts the text immediately following the keywords. In some arrangements, fact engine 62 also scans header 82 for location data that may be derived from an IP address within a "Return-Path" entry. For example, header 82 contains information that Member B, who sent email 80 to Member A, is at a geolocation determined from IP address 156.158.39.119. Further, fact engine 62 may also include information about other people mentioned in the email ("Member C"), as well as a context in which to place the people included in the email ("Weekly Meeting"). An example of a fact derived from header 82 is "Member A, Member B, and Member C are scheduled to attend a weekly meeting on November 5."

In a similar fashion, eKBA system 12 derives facts regarding Member A from email 86 in order to derive confounders 36. As with header 82 above, fact engine 62 scans header 88 of email 86 for particular keywords. An example of a fact derived from header 86 is "Member A, Member D, and Member E had lunch on November 1."

Query engine 58 derives queries 30 from facts 22 such as that involving the weekly meeting above and stores derived KBA queries 30 and corresponding correct answers in question database 76. Similarly, confounder engine 60 derives confounders 36 from facts such as that involving the lunch above 22 and stores confounders 36 in confounder database 78. An example KBA question 42 (see FIG. 1) takes the following form:

"With which member of the organization were you scheduled to attend the weekly meeting?

"a) Member C

"b) Member D

"c) Member E"

In some arrangements, when there are many confounders 36 stored in confounders database 78, processor 54 selects incorrect answers from confounders 36 at random. In other arrangements, however, processor 54 may select an incorrect answer from confounders 36 based on an elapsed time since that incorrect answer was stored in confounders database 78. Further details of how confounders 36 are stored in confounder database 78 are discussed below with respect to FIG. 4.

FIG. 4 illustrates example entries 100 and 102 of confounder database 78 as expressed in table 90. Table 90 includes a user identifier field 92, a context field 94, and a confounders field 96.

In some arrangements, table 90 takes the form of an inverted list. That is, each entry in the confounders field 96 points to an index at which further information about the entry may be found. An advantage of formatting table 90 as an inverted list is that processor 54 (see FIG. 2) may locate confounders in a similarly rapid manner as would a search engine.

Entries 100 and 102 reference the user identifier 92 of Member A, about whom eKBA system 12 is preparing KBA questions. These entries, however, refer to different contexts: entry 100 refers to "Weekly Meeting November 5," while entry 102 refers to "Lunch," as described in the examples above. It should be understood that processor 54 extracted these context values from subject lines in emails 80 and 86 (see FIG. 3). In some arrangements, processor 54 may extract values of context field 94 from other portions of header 88, e.g. geolocation as derived from a return IP address.

In constructing table 90, confounder engine 60 (see FIG. 2) extracts a fact 22 from subset 22b (see FIG. 1) and parses that fact according to user identifier field 92 and context field 94. Confounder engine 60 selects confounders from the fact according to the value of the context field 94 and a value of a confounder context (not pictured). For example, the confounders listed in entry 100 are user identifiers corresponding to those members of the organization who were not at the weekly meeting on November 5 (i.e., the value of context field 94). Confounder engine 60 found sources for such user identifiers in facts derived from emails other than email 80, e.g., email 86.

Because table 90 is arranged as an inverted list, confounder engine 60 provides links from values of confounders field 96 to particular entries in confounders database 74 where information about the confounders is located. For example, in entry 100, the value "Member D" in confounders field 96 has a link (not pictured) to entries in confounders database 74 that have "Member D" as a value in user identifier field 92. Such links provide verification that the information extracted from email 86 is correct.

In some arrangements, eKBA system 12 imposes policies that restrict certain KBA questions from being posed to user 38. For example, the organization may not wish for particular details concerning a merger to be leaked to user 38 while the merger is taking place. In such a case, eKBA system 12 modifies confounder code 66 to reflect such policies. In many cases, these policies vary between groups of members. Emails 24 (see FIG. 1) being arranged in an Active Directory structure allows eKBA system 12 to apply different policies to different groups organized within the organization. Details of such an application of policies to confounder generation is discussed below with respect to FIG. 5.

Figure 5:
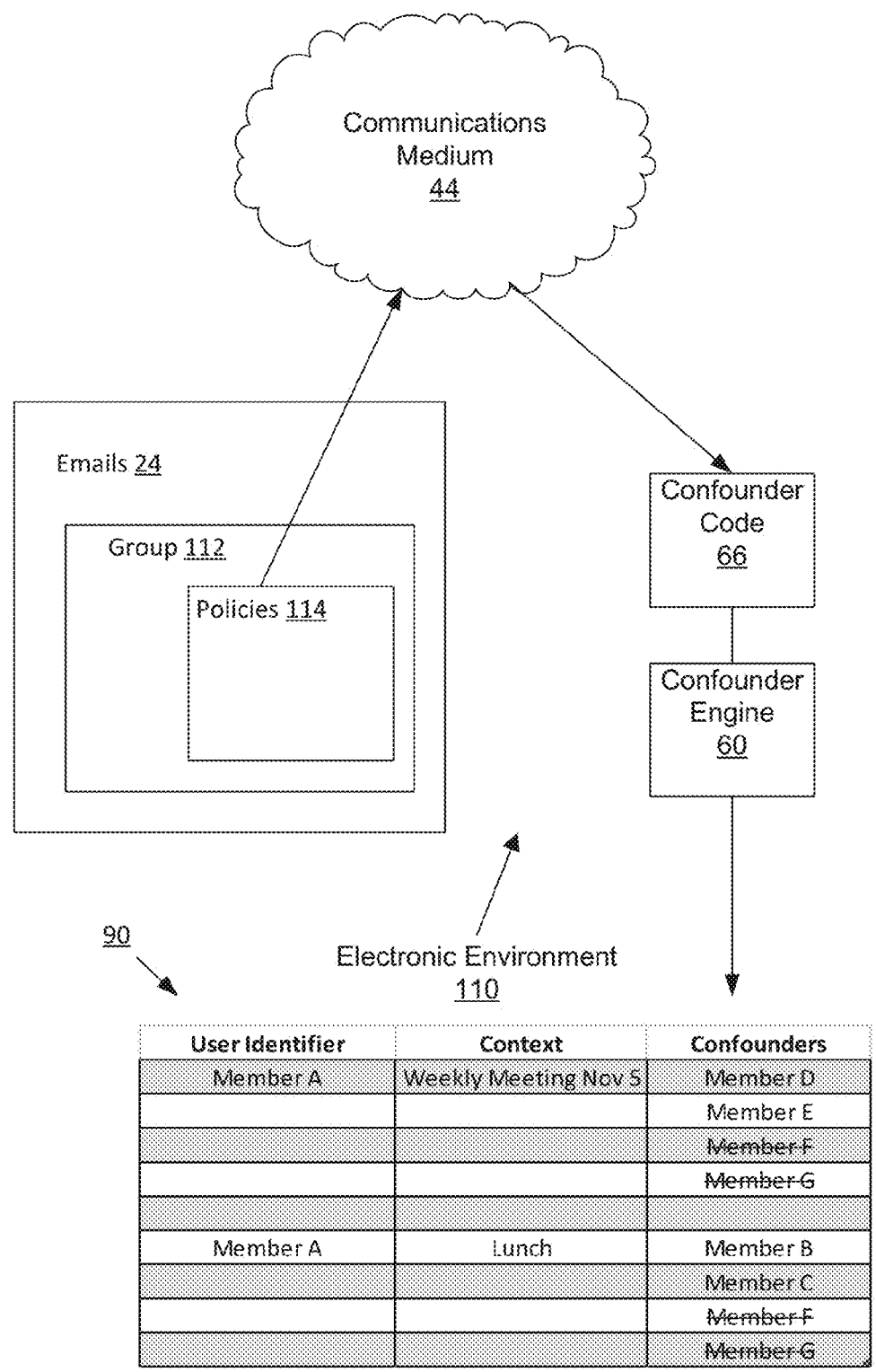
FIG. 5 is a block diagram illustrating an example eKBA system within the electronic environment shown in FIG. 1.

FIG. 5 illustrates an example electronic environment 110 in which emails 24 are arranged in an Active Directory structure. Emails 24 contain an email group 112 having a set of policies 114 that provide rules for generating facts, and consequently KBA questions, from emails in group 112. For example, one rule of policy 114 states that the whereabouts of members having user identifiers with values "Member F" and "Member G" are not to be known to other members of the organization.

Processor 54 (see FIG. 2) translates rules in policies 114 into confounder code 66 (see FIG. 2). Confounder engine 60 then excludes user identifiers with values "Member F" and "Member G" from confounder database 74 (see FIG. 2), and, consequently, table 90 (see FIG. 4).

Figure 6:
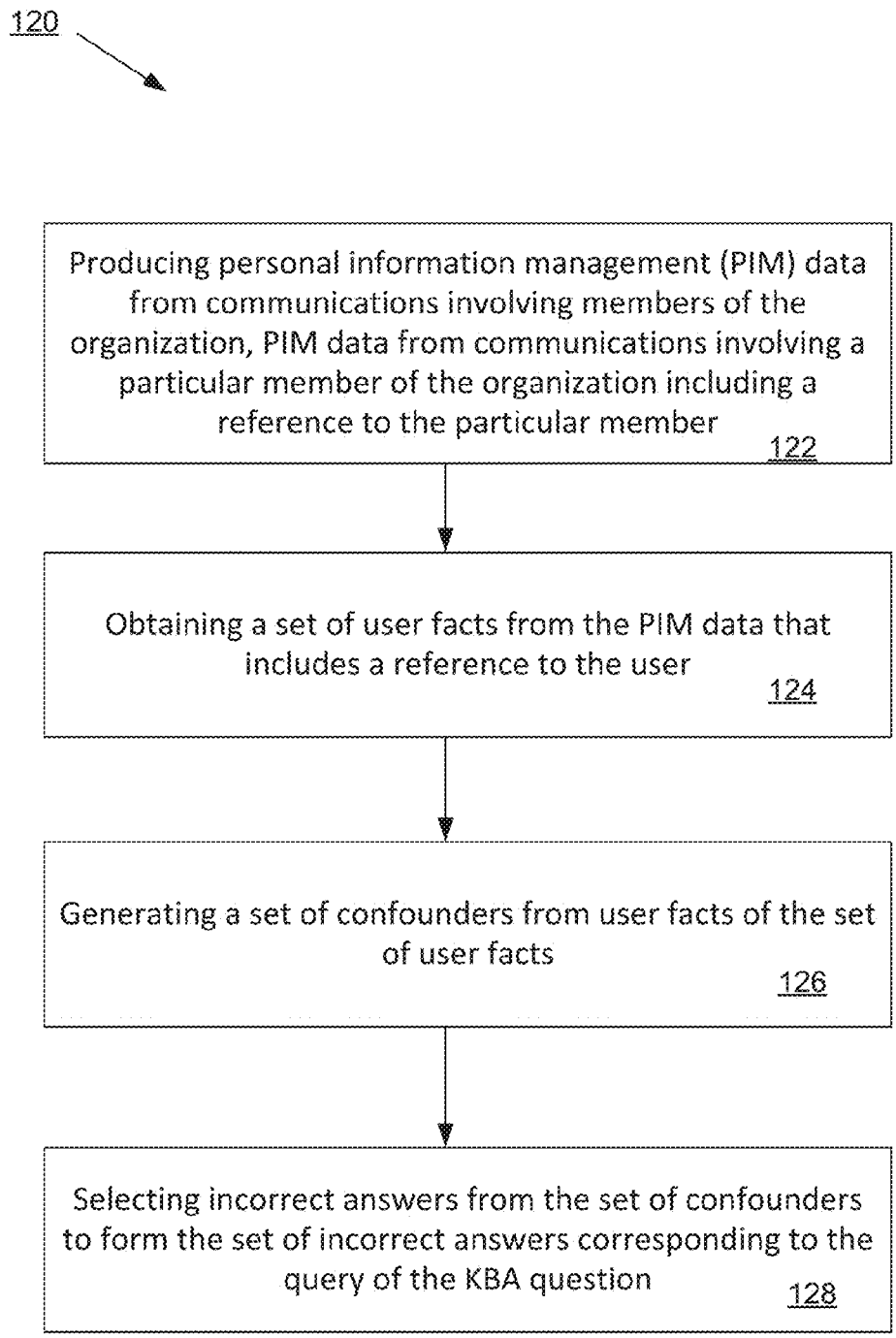
FIG. 6 is a flow chart illustrating a method of carrying out the improved technique within the electronic environment shown in FIG. 1.

FIG. 6 illustrates a method 120 of generating a knowledge-based authentication (KBA) question configured to be provided to a person requesting authentication as a user that is a member of an organization, the KBA question including a query, a correct answer corresponding to the query, and a set of incorrect answers corresponding to the query. The method includes steps 122, 124, 126, and 128. In step 122, personal information management (PIM) data is produced from communications involving members of the organization, PIM data from communications involving a particular member of the organization including a reference to the particular member. In step 124, a set of user facts is obtained from the PIM data that includes a reference to the user. In step 126, a set of confounders is generated from user facts of the set of user facts. In step 128, incorrect answers are selected from the set of confounders to form the set of incorrect answers corresponding to the query of the KBA question.

While various embodiments of the invention have been particularly shown and described, it will be understood by those skilled in the art that various changes in form and details may be made therein without departing from the spirit and scope of the invention as defined by the appended claims.

For example, eKBA system 12 can also determine peer circles from emails 24. For example, using link analysis, eKBA system can determine which members have which degrees of interactions with a particular member of the organization. A particular policy 114 can then have a rule stating that confounder engine 60 may only select confounders from members included in such a peer circle, i.e., when the value of a link is stronger than a threshold.

Further, it should be understood that, while the examples above were directed to deriving confounders from PIM data taken from members of an organization, the above-described improved techniques also apply to PIM data taken from users outside of the organization. Along these lines, suppose that a member of the organization works with an external supplier and receives email communications from that supplier. eKBA server 12 can then find all instances of that supplier stored on PIM server 16 and create a table of relationships between the supplier and members of the organization within a database in eKBA server 12.

Furthermore, it should be understood that some embodiments are directed to eKBA system 12, which is constructed and arranged to generate a knowledge-based authentication (KBA) question configured to be provided to a person requesting authentication as a user that is a member of an organization. Some embodiments are directed to a process of generating a KBA question. Also, some embodiments are directed to a computer program product which enables computer logic to generate a KBA question.

In some arrangements, eKBA system 12 is implemented by a set of processors or other types of control/processing circuitry running software. In such arrangements, the software instructions can be delivered, within eKBA system 12, respectively (see FIG. 2), in the form of a computer program product 130, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of generating a knowledge-based authentication (KBA) question configured to be provided to a person requesting authentication as a user that is a member of an organization, the KBA question including a query, a correct answer corresponding to the query, and a set of incorrect answers corresponding to the query, the method comprising:

produce, by a processor of a KBA system, personal information management (PIM) data from communications involving members of the organization, PIM data from communications involving a particular member of the organization including a reference to the particular member;

obtaining, by the processor, a set of user facts from the PIM data that includes a reference to the user;

storing the set of user facts in a memory of the KBA system;

generating, by the processor, a set of confounders from user facts of the set of user facts stored in the memory of the KBA system; and selecting, by the processor, incorrect answers from the set of confounders to form the set of incorrect answers corresponding to the query of the KBA question;

wherein the method further comprises:

producing the query and the corresponding correct answer of the KBA question from a first subset of the user facts;

wherein generating the set of confounders from the user facts includes:

producing the set of confounders from a second subset of the user facts, the second subset of the user facts being distinct from the first subset of the user facts;

wherein the PIM data includes a set of emails, each email of the set of emails including a header containing i) a user identifier that identifies the user, and ii) a context that identifies subject matter of the email;

wherein producing the query and the corresponding correct answer of the KBA question includes:

extracting the context from the header of an email of a first subset of emails of the set of emails, the first subset of user facts being derived from the first subset of emails;

wherein producing the set of confounders includes:

extracting a confounder of the set of confounders from the header of an email of a second subset of emails of the set of emails, the second subset of user facts being derived from the second subset of emails; and wherein the method further comprises:

arranging the user identifier, the context, and the set of confounders in an entry in a confounder database.

2. A method as in claim 1,
wherein arranging the user identifier, the context, and the set of confounders in an entry in a confounder database includes:
in the confounder database, storing the set of confounders in an inverted list that is indexed by the user identifier and the context.

3. A method as in claim 1,
wherein emails of the set of emails is stored within a domain of an Active Directory, the domain of the Active Directory including a policy configured to filter particular confounders from the set of confounders;
wherein extracting the confounder of the set of confounders from the header of the email of the second subset of emails includes:
filtering the particular confounders from the set of confounders according to the policy of the domain of the Active Directory.

4. A method according to claim 1,
wherein extracting the confounder of the set of confounders from the header of the email includes:
from the emails of the second subset of emails, generating a list of references to other members of the organization,
from the list of references to the other members of the organization, generating a group of peers of the user according to a link strength between the user and another member of the organization, and
selecting the confounder from the group of peers of the user.

5. A method according to claim 4,
wherein the context includes a geolocation corresponding to a location of the user at the time the email from which the context was extracted was sent;
wherein the group of peers includes a set of members of the organization having a link to the geolocation; and
wherein selecting the confounder from the group of peers includes:
obtaining, as the confounder, a user identifier of a member of the set of members of the organization.

6. A method as in claim 1,
wherein the communications involving the members of the organization includes communications with an outside entity outside of the organization;
wherein producing the PIM data from the communications involving the members of the organization includes:
storing, in a link database, relationship data including associations between the outside entity and the members of the organization; and
wherein obtaining the set of user facts from the PIM data that includes a reference to the user includes:
forming the facts based on the relationship data that includes associations between the outside entity and the user.

7. A knowledge-based authentication (KBA) system constructed and arranged to generate a KBA question configured to be provided to a person requesting authentication as a user that is a member of an organization, the KBA question including a query, a correct answer corresponding to the query, and a set of incorrect answers corresponding to the query, the KBA system comprising:
a network interface;
memory; and
a controller including controlling circuitry, the controlling circuitry being constructed and arranged to:
produce personal information management (PIM) data from communications involving members of the organization, PIM data from communications involving a particular member of the organization including a reference to the particular member;
obtain a set of user facts from the PIM data that includes a reference to the user;
generate a set of confounders from user facts of the set of user facts; and
select incorrect answers from the set of confounders to form the set of incorrect answers corresponding to the query of the KBA question;
wherein the controlling circuitry is further constructed and arranged to:
produce the query and the corresponding correct answer of the KBA question from a first subset of the user facts;
wherein generating the set of confounders from the user facts includes:
producing the set of confounders from a second subset of the user facts, the second subset of the user facts being distinct from the first subset of the user facts;

wherein the PIM data includes a set of emails, each email of the set of emails including a header containing i) a user identifier that identifies the user, and ii) a context that identifies subject matter of the email;

wherein producing the query and the corresponding correct answer of the KBA question includes:

extracting the context from the header of an email of a first subset of emails of the set of emails, the first subset of user facts being derived from the first subset of emails;

wherein producing the set of confounders includes:

extracting a confounder of the set of confounders from the header of an email of a second subset of emails of the set of emails, the second subset of user facts being derived from the second subset of emails; and wherein the controlling circuitry is further constructed and arranged to:

arrange the user identifier, the context, and the set of confounders in an entry in a confounder database.

8. A system as in claim 7, wherein arranging the user identifier, the context, and the set of confounders in an entry in a confounder database includes:

in the confounder database, storing the set of confounders in an inverted list that is indexed by the user identifier and the context.

9. A system as in claim 7, wherein emails of the set of emails is stored within a domain of an Active Directory, the domain of the Active Directory including a policy configured to filter particular confounders from the set of confounders;

wherein extracting the confounder of the set of confounders from the header of the email of the second subset of emails includes:

filtering the particular confounders from the set of confounders according to the policy of the domain of the Active Directory.

10. A system according to claim 7, wherein extracting the confounder of the set of confounders from the header of the email includes:

from the emails of the second subset of emails, generating a list of references to other members of the organization, from the list of references to the other members of the organization, generating a group of peers of the user according to a link strength between the user and another member of the organization, and selecting the confounder from the group of peers of the user.

11. A system according to claim 10, wherein the context includes a geolocation corresponding to a location of the user at the time the email from which the context was extracted was sent;

wherein the group of peers includes a set of members of the organization having a link to the geolocation; and wherein selecting the confounder from the group of peers includes:

obtaining, as the confounder, a user identifier of a member of the set of members of the organization.

12. A computer program product having a non-transitory, computer-readable storage medium which stores code to generate a knowledge-based authentication (KBA) question configured to be provided to a person requesting authentication as a user that is a member of an organization, the KBA question including a query, a correct answer corresponding to the query, and a set of incorrect answers corresponding to the query, the code including instructions to:

produce personal information management (PIM) data from communications involving members of the organization, PIM data from communications involving a particular member of the organization including a reference to the particular member;

obtain a set of user facts from the PIM data that includes a reference to the user;

generate a set of confounders from user facts of the set of user facts; and select incorrect answers from the set of confounders to form the set of incorrect answers corresponding to the query of the KBA question;

wherein the code includes further instructions to:

produce the query and the corresponding correct answer of the KBA question from a first subset of the user facts;

wherein generating the set of confounders from the user facts includes:

producing the set of confounders from a second subset of the user facts, the second subset of the user facts being distinct from the first subset of the user facts;

wherein the PIM data includes a set of emails, each email of the set of emails including a header containing i) a user identifier that identifies the user, and ii) a context that identifies subject matter of the email;

wherein producing the query and the corresponding correct answer of the KBA question includes:

extracting the context from the header of an email of a first subset of emails of the set of emails, the first subset of user facts being derived from the first subset of emails;

wherein producing the set of confounders includes:

extracting a confounder of the set of confounders from the header of an email of a second subset of emails of the set of emails, the second subset of user facts being derived from the second subset of emails; and wherein the code includes further instructions to:

arrange the user identifier, the context, and the set of confounders in an entry in a confounder database.

13. A computer program product as in claim 12, wherein arranging the user identifier, the context, and the set of confounders in an entry in a confounder database includes:

in the confounder database, storing the set of confounders in an inverted list that is indexed by the user identifier and the context.

14. A computer program product as in claim 12, wherein emails of the set of emails is stored within a domain of an Active Directory, the domain of the Active Directory including a policy configured to filter particular confounders from the set of confounders;

wherein extracting the confounder of the set of confounders from the header of the email of the second subset of emails includes:

filtering the particular confounders from the set of confounders according to the policy of the domain of the Active Directory.

15. A method of generating a knowledge-based authentication (KBA) question configured to be provided to a person requesting authentication as a user that is a member of an organization, the KBA question including a query, a correct answer corresponding to the query, and a set of incorrect answers corresponding to the query, the method comprising:

producing, by a processor of a KBA system, personal information management (PIM) data from communications involving members of the organization, PIM data from communications involving a particular member of the organization including a reference to the particular member;

obtaining, by the processor, a set of user facts from the PIM data that includes a reference to the user;

storing the set of user facts in a memory of the KBA system;

generating, by the processor, a set of confounders from user facts of the set of user facts stored in the memory of the KBA system; and selecting, by the processor, incorrect answers from the set of confounders to form the set of incorrect answers corresponding to the query of the KBA question;

wherein the communications involving members of the organization include records of communications between parties, the parties including the user and other members of the organization; and wherein obtaining the set of user facts from the PIM data includes forming, as a user fact of the set of user facts, a statement describing an interaction that took place between the user and one of the other members of the organization, a confounder generated from the user fact including a reference to the one of the other members of the organization;

wherein the records of the communications between the parties include (i) a record of a first communication between the user and a first other member of the organization and (ii) a record of a second communication between the user and a second other member of the organization;

wherein obtaining the set of user facts includes:

producing a first user fact from the first communication, the first fact having references to the user and the first other member of the organization, and producing a second user fact from the first communication, the second user fact having references to the user and the second other member of the organization;

wherein generating the set of confounders includes identifying, as a confounder of the set of confounders, an incorrect answer from the reference to the first other member of the organization; and wherein the method further comprises forming the correct answer from the reference to the second other member of the organization.

\* \* \* \* \*